United States Patent
Aubineau et al.

(10) Patent No.: US 12,001,257 B2
(45) Date of Patent: Jun. 4, 2024

(54) POWER MANAGEMENT SYSTEM WITH CAPACITOR

(71) Applicant: NXP USA, Inc., Austin, TX (US)

(72) Inventors: Vincent Aubineau, Arêches (FR); Michael Andreas Staudenmaier, Munich (DE); Pierre Juste, Montigny le Bretonneux (FR)

(73) Assignee: NXP USA, Inc., Austin, TX (US)

( * ) Notice: Subject to any disclaimer, the term of this patent is extended or adjusted under 35 U.S.C. 154(b) by 256 days.

(21) Appl. No.: 17/456,904

(22) Filed: Nov. 30, 2021

(65) Prior Publication Data

US 2023/0108091 A1  Apr. 6, 2023

(30) Foreign Application Priority Data

Oct. 1, 2021  (EP) .................................. 21306375

(51) Int. Cl.
*G11C 11/00* (2006.01)
*G06F 1/3203* (2019.01)
*H02M 3/07* (2006.01)

(52) U.S. Cl.
CPC ............ *G06F 1/3203* (2013.01); *H02M 3/07* (2013.01)

(58) Field of Classification Search
CPC .................................................... G06F 1/3203
See application file for complete search history.

(56) References Cited

U.S. PATENT DOCUMENTS

| 8,627,119 | B2 | 1/2014 | Barnes et al. |
| 11,293,962 | B2* | 4/2022 | Rowley ................. G06F 1/3225 |
| 2022/0293514 | A1* | 9/2022 | Yu ........................... G06F 1/263 |
| 2023/0108091 | A1* | 4/2023 | Aubineau ................. G06F 1/26 365/227 |
| 2023/0268763 | A1* | 8/2023 | Li ........................ H02J 7/0024 320/116 |

FOREIGN PATENT DOCUMENTS

| GB | 2472051 B | 10/2012 |
| GB | 2472050 B1 | 6/2013 |
| WO | 2019127789 A1 | 7/2019 |

OTHER PUBLICATIONS

Wallinger, Karl, "Using PMICs to support a wide range of power sequencing requirements", Nov. 1, 2016, 3 pgs.
On Semiconductor, "Power Management (PMIC)—Automotive, Multi-Output, Safety Applications", NCV97200, Rev 4, Oct. 2019, 23 pgs.
Infineon, "Design Guidelines for Power Systems for Traveo Family MCUs with Multiple Power-Supplies", Rev A, Jun. 15, 2021, 15 pgs.
Microchip, "AVR® Brown-Out Detection", https://microchipdeveloper.com/8avr.bod, retrieved Sep. 24, 2021, 3 pgs.

* cited by examiner

*Primary Examiner* — Pho M Luu

(57) ABSTRACT

A power management system includes a capacitor, control logic configured to determine a wait time in response to a comparison of a voltage of the capacitor to a threshold voltage and to initiate a startup upon expiration of the wait time, and a control circuit configured to charge the capacitor, discharge the capacitor, and provide the voltage of the capacitor to the control logic.

21 Claims, 12 Drawing Sheets

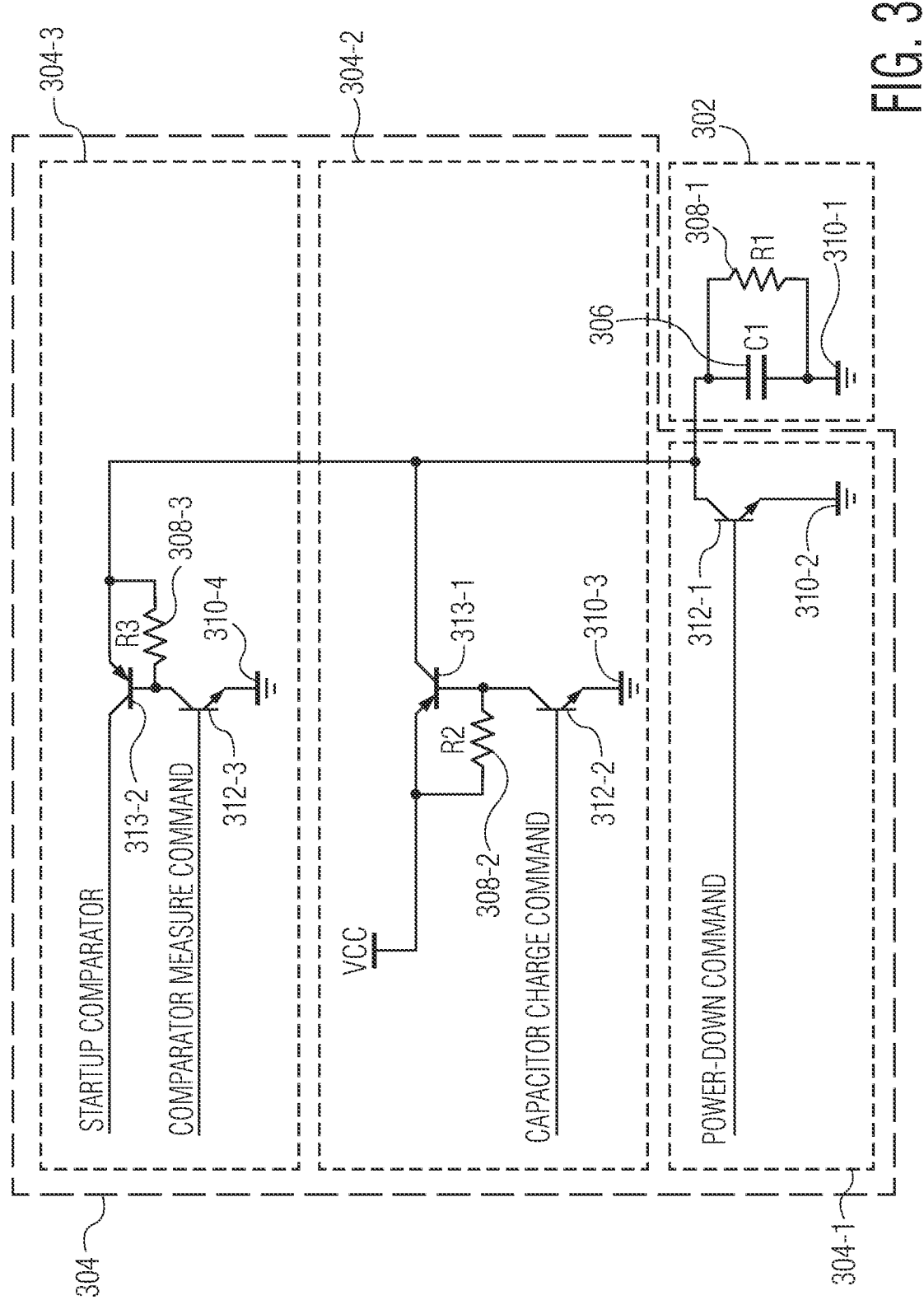

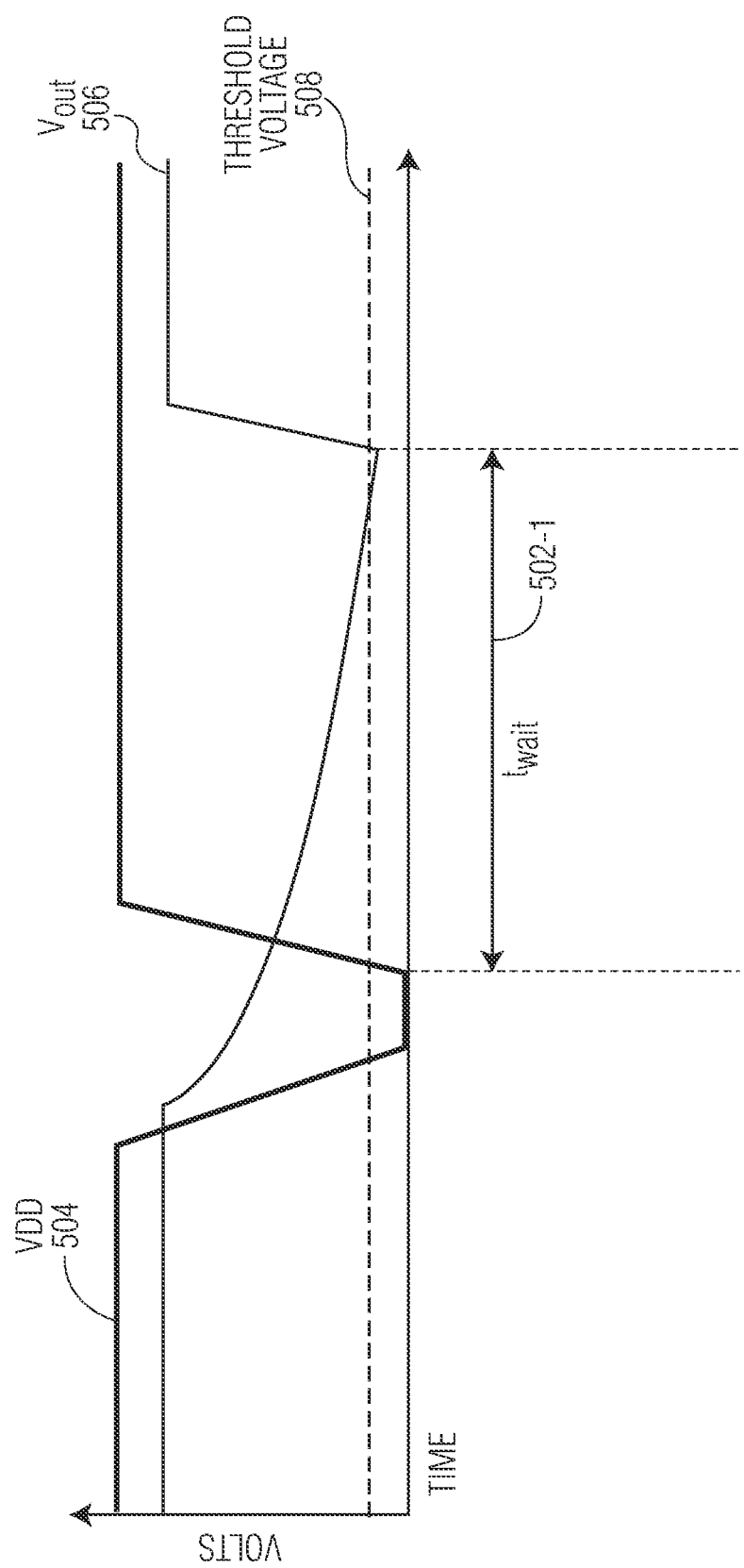

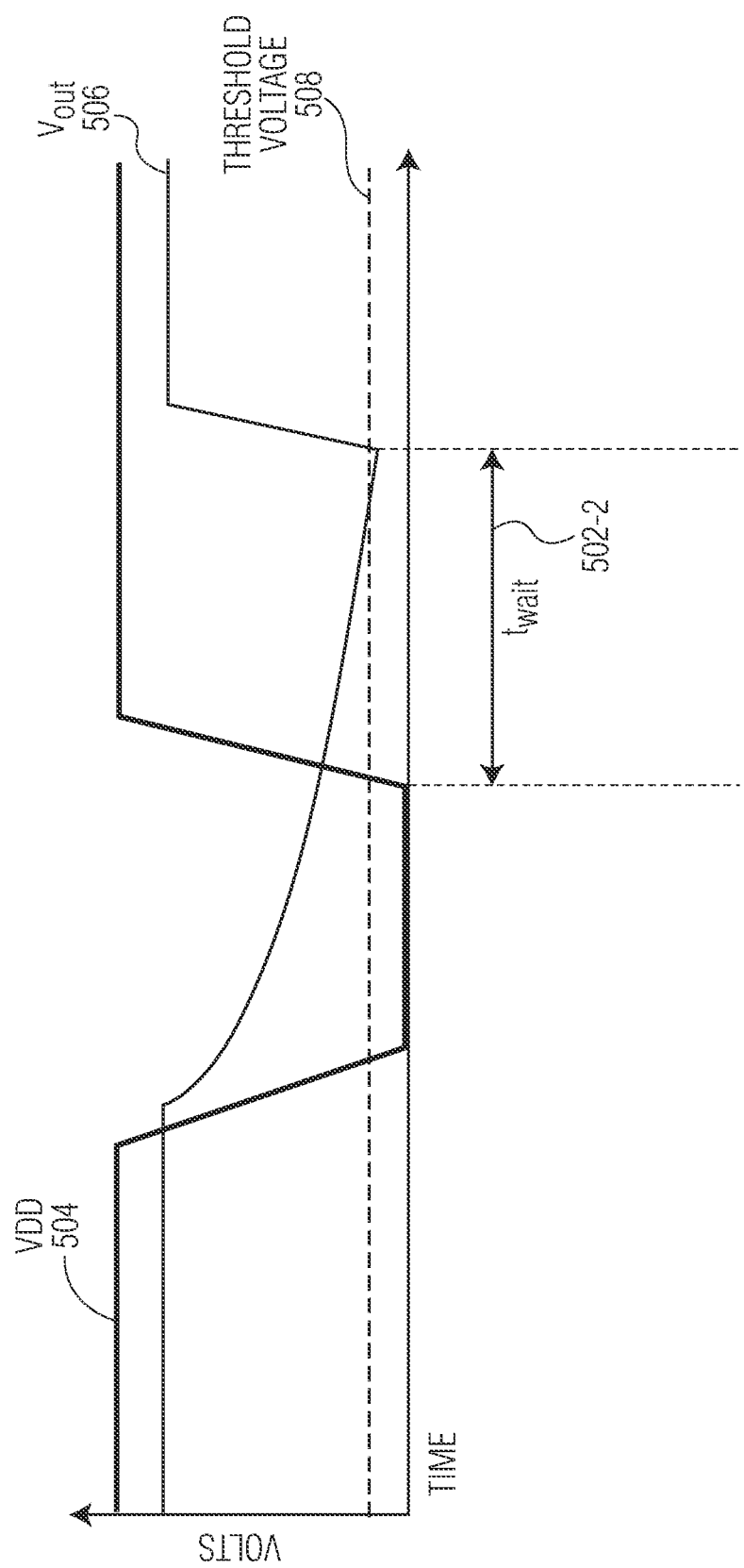

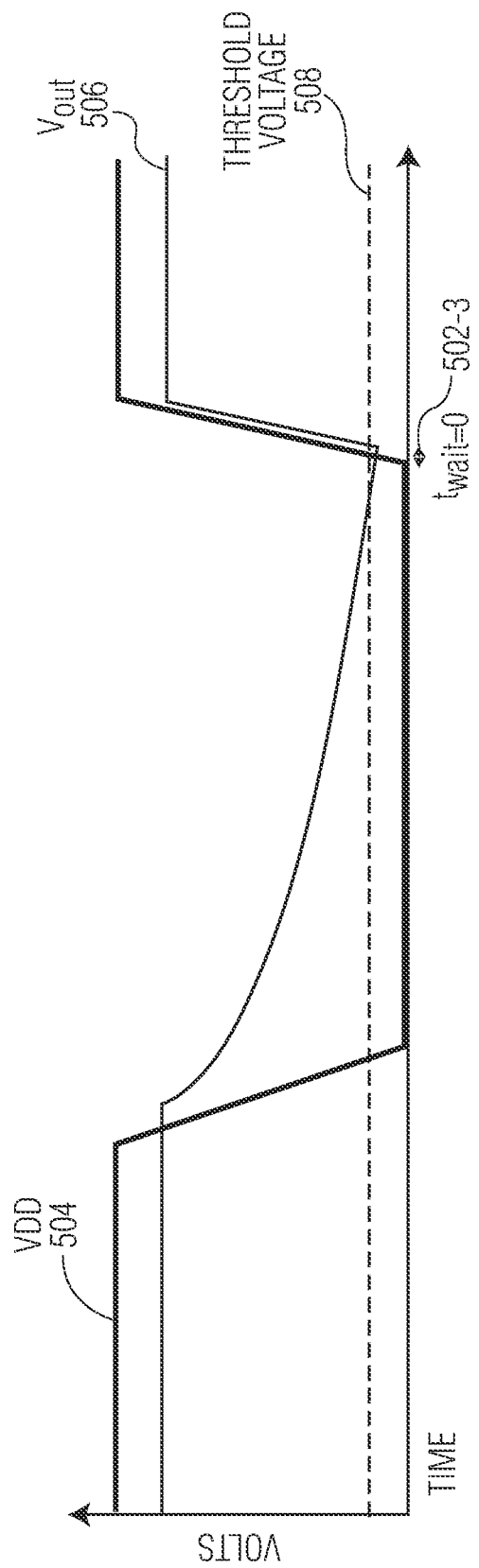

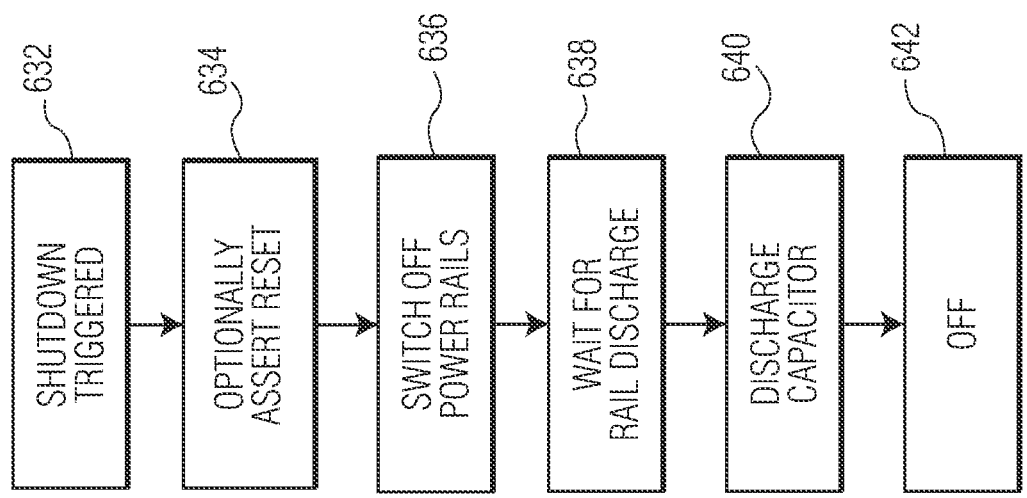

POWER MANAGEMENT SYSTEM WITH CAPACITOR

CROSS-REFERENCE TO RELATED APPLICATIONS

This application claims the priority under 35 U.S.C. § 119 of European patent application no. 21306375.3, filed Oct. 1, 2021 the contents of which are incorporated by reference herein.

BACKGROUND

In electrical systems, e.g., System-on-Modules (SoMs), System-on-Chips (SoCs), Microcontroller Units (MCUs), etc., a power management system, such as a Power Management Integrated Circuit (PMIC), may be used to help control and/or regulate electrical power. For example, a power management system may manage power-up and power-down of a connected system. However, in some cases, e.g., battery loss, quick power-down, quick power-up, etc., the power management system may fail to properly manage a power-up and/or power-down operation, which can cause the connected system to become unusable.

SUMMARY

Embodiments of a method and an apparatus for power management are disclosed. In an embodiment, a power management system includes a capacitor, control logic configured to determine a wait time in response to a comparison of a voltage of the capacitor to a threshold voltage and to initiate a startup upon expiration of the wait time, and a control circuit configured to charge the capacitor, discharge the capacitor, and provide the voltage of the capacitor to the control logic.

In an embodiment, the capacitor is charged once voltage rails of a Power Management Integrated Circuit (PMIC) are supplied.

In an embodiment, the control logic, the control circuit, and the capacitor are connected within a PMIC.

In an embodiment, the control logic and the control circuit are connected within a PMIC, and the capacitor is external to the PMIC.

In an embodiment, the PMIC includes a pin for connection to the capacitor.

In an embodiment, the control circuit includes a discharge circuit, a charge circuit, and a trigger circuit.

In an embodiment, the discharge circuit includes a switch configured to control discharge of the capacitor.

In an embodiment, the charge circuit includes a switch configured to control charging of the capacitor.

In an embodiment, the trigger circuit includes a switch configured to provide the voltage of the capacitor to the control logic.

In an embodiment, the discharge circuit includes a switch configured to control discharge of the capacitor, the charge circuit includes a switch configured to control charging of the capacitor, and the trigger circuit includes a switch configured to provide the voltage of the capacitor to the control logic.

A method for power management is also disclosed. The method involves charging, once voltage rails of a PMIC are supplied, a capacitor with a voltage, performing, by the PMIC, a startup sequence, where the startup sequence involves comparing the voltage of the capacitor to a threshold voltage, determining a wait time of a startup in response to the comparison, and initiating the startup upon expiration of the wait time.

In an embodiment, the PMIC includes control logic and a control circuit connected to the capacitor, and where the control circuit includes a discharge circuit, a charge circuit, and a trigger circuit.

In an embodiment, a switch in the discharge circuit is opened to discharge the capacitor.

In an embodiment, a switch in the charge circuit is opened to charge the capacitor.

In an embodiment, a switch in the trigger circuit is opened to provide the voltage of the capacitor to the control logic.

In an embodiment, the control logic, the control circuit, and the capacitor are connected within the PMIC.

In an embodiment, the control logic and the control circuit are connected within the PMIC, and the capacitor is external to the PMIC.

An embodiment of a PMIC is also disclosed. The PMIC includes control logic configured to determine a wait time in response to a comparison of a voltage of a capacitor to a threshold voltage and to initiate a startup upon expiration of the wait time, and a control circuit configured to provide the voltage of the capacitor to the control logic.

In an embodiment, the PMIC further includes the capacitor.

In an embodiment, the PMIC includes a pin for connection to the capacitor.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 3 depicts an example implementation of a capacitor and a control circuit.

FIG. 5A depicts a graph of voltages that correspond to a power-cycle with a startup performed after a wait time.

FIG. 5B depicts a graph of voltages that correspond to a power-cycle with a startup performed after another wait time.

FIG. 5C depicts a graph of voltages that correspond to a power-cycle with a startup performed without a wait time.

FIG. 6C depicts a process flow diagram of a technique for a PMIC shutdown in accordance with an embodiment of the invention.

Throughout the description, similar reference numbers may be used to identify similar elements.

DETAILED DESCRIPTION

Figure 1:
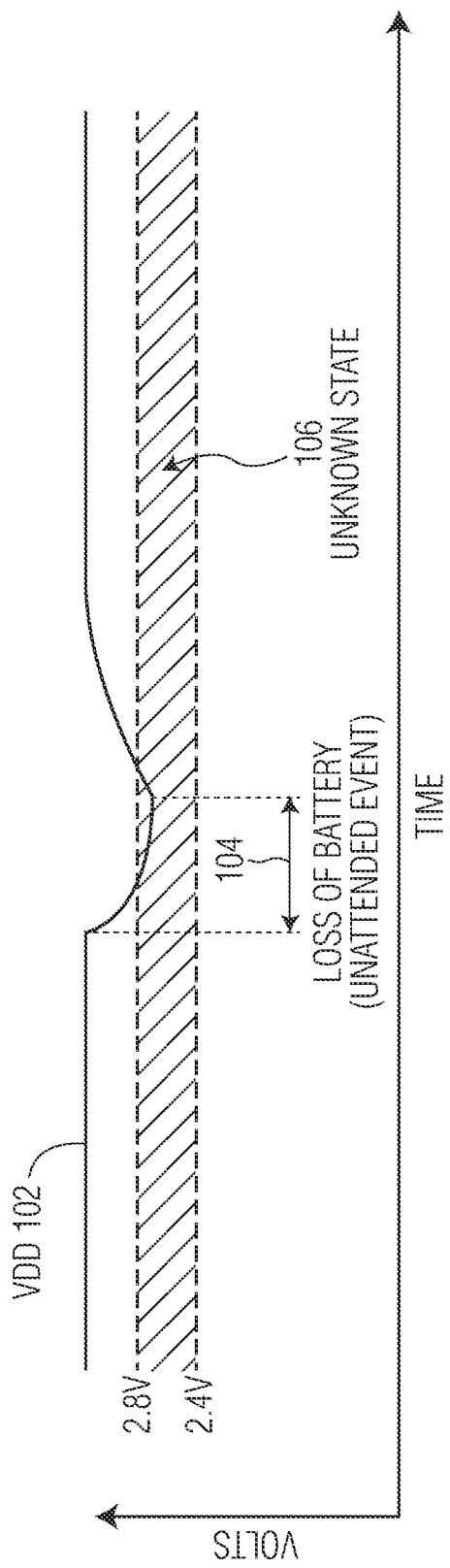
FIG. 1 depicts a graph of voltage that corresponds to a short voltage drop event.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

The embodiments described herein are directed to power management systems. As an example, a power management system includes a Power Management Integrated Circuit (PMIC) that, for example, receives a voltage input and provides a regulated voltage output. In some embodiments, PMICs may be connected to other systems (e.g., System-on-Modules (SoMs), System-on-Chips (SoCs), Microcontroller Units (MCUs)), such that the PMICs may manage power-up and power-down of the other systems. In some embodiments, when a corner case event (a problem that occurs outside normal operating parameters) occurs, e.g., battery loss, quick power-down, quick power-up, a short voltage drop, etc., a PMIC and a connected system (e.g., SoC or MCU) may not successfully implement a corresponding power-up sequence or power-down sequence without expensive external components (e.g., active discharge, external MCU, etc.) as the PMIC may not check if voltage rails are discharged before power-up. As described herein, a "voltage rail" may also act as a power rail when supplying power. In such an embodiment, if the corresponding power-up sequence or power-down sequence is not successfully implemented, the PMIC and/or the connected system may become unusable, such that the connected system (e.g., SoC or MCU) may need to be powered off long enough (to ensure power rails discharge), or reset to recover the PMIC and/or the connected system. In some embodiments, a PMIC may apply a reset signal during a power-up sequence once voltage rails are considered stable. An example of a corner case event is described in further detail with reference to FIG. 1.

FIG. 1 depicts a graph of voltage that corresponds to a short voltage drop event. In the embodiment of FIG. 1, the voltage (y-axis) of a voltage drain supply (VDD) 102 is shown as changing over time (x-axis) during the short voltage drop event. In an embodiment, the VDD 102 may correspond to a VDD of a system (e.g., SoM, SoC, MCU, etc.) that may be connected to a power management system (e.g., PMIC). In such an embodiment, the system may experience a loss of battery (e.g., unattended event) 104 where the VDD 102 gradually drops to an unknown state 106 between, e.g., 2.8V and 2.4V. As an example, the loss of battery (e.g., unattended event) 104 may be the short voltage drop event experienced by the system. In such an embodiment, the unknown state 106 may be representative of, for example, a high probability of permanent hang, a corrupted register, and/or an unknown Secure Non-Volatile Storage (SNVS) state.

Because the system may not detect that the VDD 102 dropped to the unknown state 106, a startup sequence (and Power-on-Reset (POR)) initiated once the VDD 102 has returned to a proper operation voltage after the loss of battery 104 may cause the system to become unusable. As an example, a startup sequence (sometimes referred to herein as a "power-up sequence", or a "power-on sequence") may be initiated by a POR, such that the startup sequence and the POR may be coupled operations. Although the power management system is able to initiate the POR (e.g., assert a reset signal) once the VDD 102 is stable, the system may not properly restart or re-activate because the VDD 102 did not drop below the unknown state 106 and/or because voltage rails were not properly discharged. As an example, the startup sequence (and the POR) may involve a circuit providing a predictable, regulated voltage to a microprocessor or microcontroller with an initial application of power. In some embodiments, a startup initiated after returning to a proper operation voltage from the unknown state 106 may cause the power management system and/or the connected system to become unusable as a result of voltage rails (and bulk capacitors) not being properly discharged (e.g., not fully discharged) before the startup. As an example, a startup may involve the startup of a system (e.g., SoC) connected to a power management system (e.g., PMIC). In such an embodiment, the ability of a system and/or a PMIC to detect when the VDD 102 is in the unknown state 106 may help to ensure that voltage rails properly discharge.

In accordance with an embodiment of the invention, a power management system includes a capacitor, control logic configured to determine a wait time in response to a comparison of a voltage of the capacitor to a threshold voltage and to initiate a startup upon expiration of the wait time, and a control circuit configured to charge the capacitor, discharge the capacitor, and provide the voltage of the capacitor to the control logic. As an example, the power management system may be configured to switch on a PMIC, optionally wait to switch on the PMIC until voltage rails are discharged (if needed), and signal POR to a connected system. By comparing a voltage of a capacitor to a threshold voltage, a power management system is able to detect when voltage rails (and bulk capacitors) have not been properly discharged, and in response, implement a wait time for initiating a startup. The wait time can help a system (e.g., SoC) connected to the power management system avoid becoming unusable in corner case events by ensuring voltage rails (and bulk capacitors) properly discharge, therefore further improving the overall efficiency and performance of power management systems. For example, adaptively implementing the wait time may help the power management system by improving the startup time (for non-critical cases) while adaptively adding (discharge) waiting time if needed.

Figure 2A:
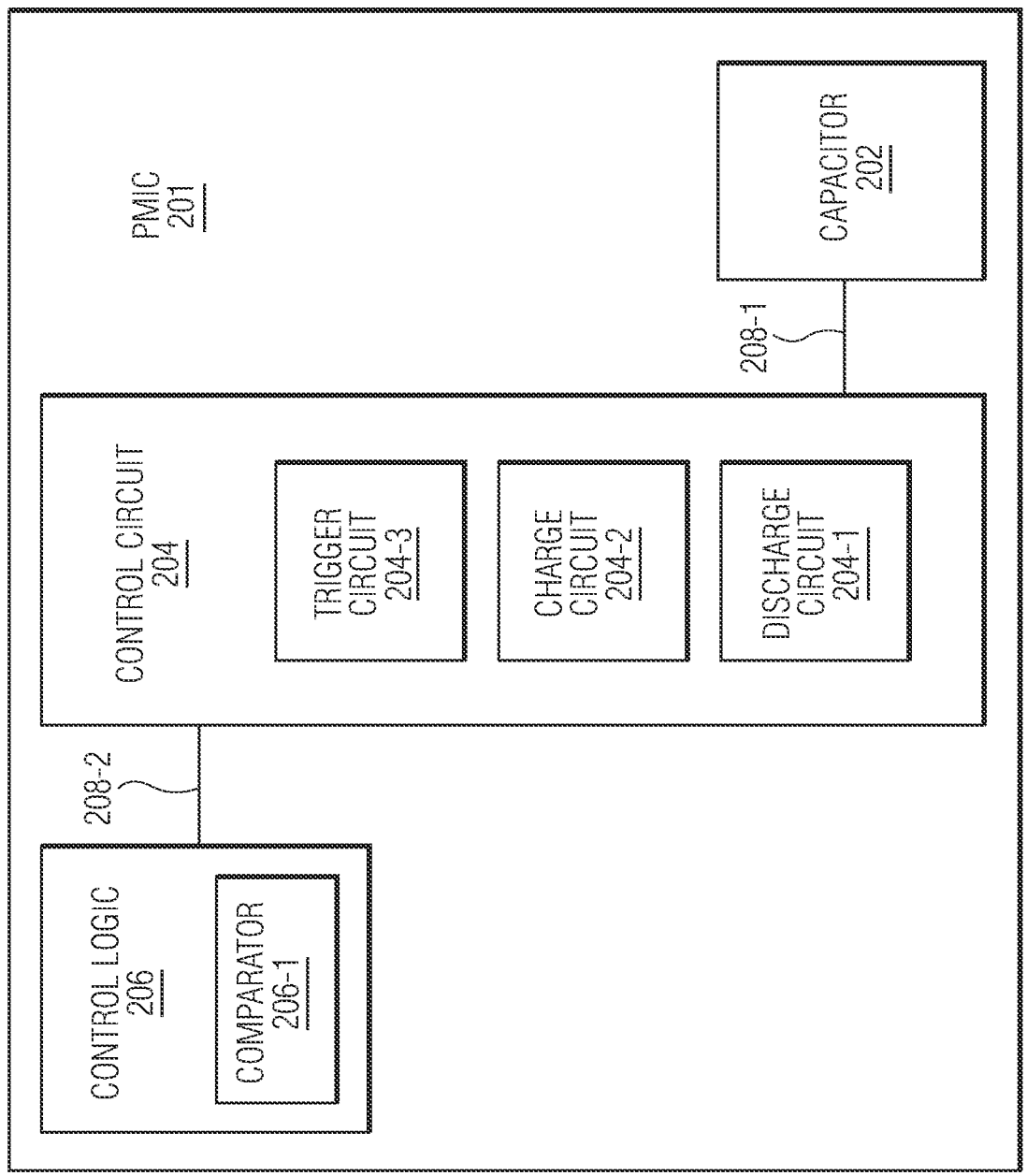
FIG. 2A depicts a functional block diagram of a power management system.
Figure 2B:
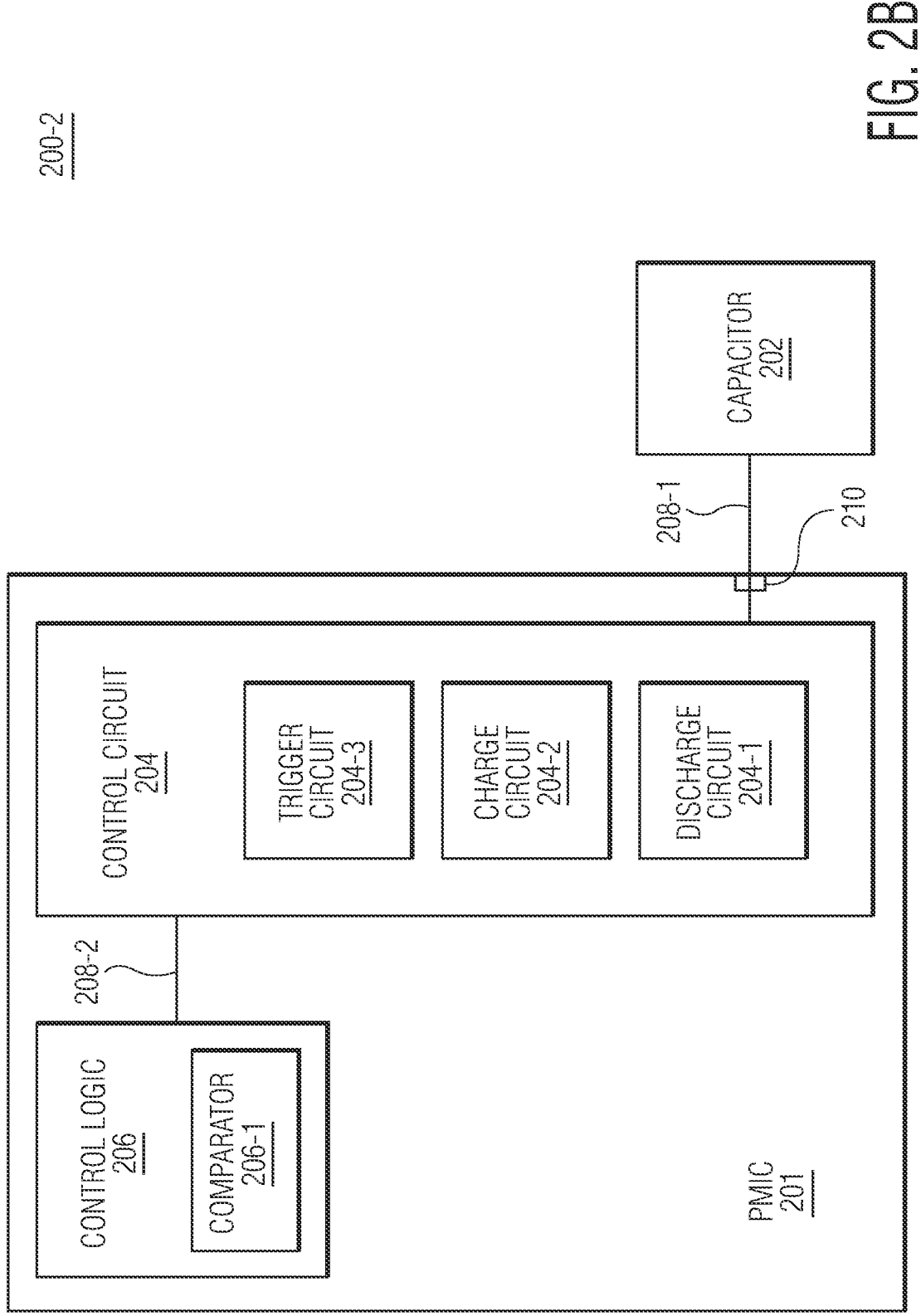
FIG. 2B depicts a functional block diagram of another power management system.

A capacitor may be internal to a PMIC of a power management system or external to a PMIC of a power management system. FIG. 2A depicts an example of a power management system in which the capacitor is internal to the PMIC and FIG. 2B depicts an example of a power management system in which the capacitor is external to the PMIC.

FIG. 2A depicts a functional block diagram of a power management system, 200-1, in accordance with an embodiment of the invention. In the embodiment of FIG. 2A, the power management system 200-1 includes a capacitor 202, a control circuit 204, and control logic 206, that are connected within a PMIC 201. For example, there may be a first connection 208-1 between the capacitor 202 and the control circuit 204, and a second connection 208-2 between the control circuit 204 and the control logic 206.

In an embodiment, the control circuit 204 includes three sub-circuits, a discharge circuit 204-1, a charge circuit 204-2, and a trigger circuit 204-3. In some embodiments, the charge circuit 204-2 is configured to charge the capacitor 202 with a voltage (e.g., VDD of 1.8V, 2.5V, etc.) once voltage rails of the PMIC 201 are supplied. In some embodiments, the trigger circuit 204-3 is configured to provide the voltage of the capacitor 202 to a comparator 206-1 of the control logic 206 during an initiation of a startup sequence. As an example, the comparator 206-1 may receive the voltage of the capacitor 202, compare the voltage to a threshold voltage, and output a signal in response to the comparison. As described herein, a "threshold voltage" may be defined as a reference voltage that may be used by the power management system to determine if a wait time is warranted, and may be selected (e.g., set) during design of the power management system. As another example, the threshold voltage, the capacitor 202, and a resistor (not shown) which may be parasitic, may collectively define a time constant that determines a length of time for voltage rails to discharge. In some embodiments, when the PMIC 201 performs a startup sequence (and POR), the startup sequence (and the POR) may involve comparing the voltage of the capacitor 202 to the threshold voltage, determining a wait time of a startup in response to the comparison, and initiating the startup of a connected system upon expiration of the wait time. As described herein, a "wait time" may be defined as a period of time in which a power management system may delay, pause, hold, etc., initiation of a startup.

In some embodiments, comparing the voltage of the capacitor 202 to the threshold voltage involves determining that the voltage is greater than or less than the threshold voltage. In one embodiment, when the voltage is greater than the threshold voltage, the wait time is determined relative to a standard start time. In another embodiment, when the voltage is less than the threshold voltage, there may be no wait time and the startup is initiated according to the standard start time. In an embodiment, a standard start time is implementation specific and may be predefined within the control logic. In some embodiments, comparing the voltage of the capacitor 202 to the threshold voltage involves waiting until the voltage falls below the threshold voltage, such that waiting until the voltage falls below the threshold voltage allows for an adaptive wait time.

In some embodiments, the capacitor 202 may be used by the power management system 200-1 to ensure that voltage rails and/or bulk capacitors (e.g., more than 45 μF per rail) are sufficiently discharged. As an example, a voltage of the capacitor 202 may represent how long the capacitor has been decoupled from a power supply (e.g., off) and may further indicate whether voltage rails and/or bulk capacitors have sufficiently discharged. In some embodiments, the capacitor may be discharged when shutting down the PMIC 201.

In an embodiment, implementing the capacitor 202 within the PMIC 201 may be advantageous because an internal capacitor enables an integrated solution. In an embodiment, implementing the capacitor 202 within the PMIC 201 may involve using a capacitance of the capacitor 202 (e.g., parasitic capacitance) to define a time constant which may be referenced by the power management system 200-1. In such an embodiment, the time constant may determine a length of time for voltage rails to discharge. In another embodiment, implementing the capacitor 202 within the PMIC 201 may involve allowing an adaptation for rail-uncharge characteristic thresholds to be selectable in the PMIC 201.

FIG. 2B depicts a functional block diagram of another power management system, 200-2, in accordance with an embodiment of the invention, in which a capacitor, 202, is integrated into a PMIC, 201. In the embodiment of FIG. 2B, the power management system 200-2 includes the capacitor 202, a control circuit 204 that includes three sub-circuits, a discharge circuit 204-1, a charge circuit 204-2, and a trigger circuit 204-3, and control logic 206 that includes a comparator 206-1 as described with reference to FIG. 2A. In such an embodiment, the control circuit 204 and the control logic 206 are connected within the PMIC 201, and the capacitor 202 is external to the PMIC 201. For example, there may be a first (external) connection 208-1 between the capacitor 202 and the control circuit 204, and a second (internal) connection 208-2 between the control circuit 204 and the control logic 206. In some embodiments, the PMIC 201 may include a pin, 210, as an element of the first (external) connection 208-1 to the capacitor 202. Although the PMIC 201 is shown in FIG. 2B as including one pin (e.g., pin 210), the PMIC 201 may include more than one pin or less than one pin for connection to the capacitor 202.

With reference to FIG. 2B, implementing the capacitor 202 externally to the PMIC 201 may be advantageous because external implementation may enable a physical characteristic (e.g., a layer thickness and/or surface area) of the capacitor 202 to determine a time constant. In an embodiment, implementing the capacitor 202 externally to the PMIC 201 may be advantageous because it provides the option to use a separate component (e.g., an external resistor which may be parasitic) to slowly drain the capacitor. In some embodiments, the capacitor 202 and the separate component (e.g., external resistor) may define a time constant that determines a length of time for voltage rails to discharge. In another embodiment, implementing the capacitor 202 externally to the PMIC 201 may be advantageous as the capacitor 202 may be easily disabled by connecting a pin of the PMIC 201 to ground.

An example of a control circuit and a capacitor which may be implemented in the PMICs 200-1 and 200-2 is described in further detail with reference to FIG. 3.

FIG. 3 depicts an example implementation of a capacitor, 302, and a control circuit, 304, in accordance with an embodiment of the invention. In an embodiment, the capacitor 302 and the control circuit 304 may make up part of a power management system. In the embodiment of FIG. 3, the control circuit 304 includes three sub-circuits, a discharge circuit 304-1, a charge circuit 304-2, and a trigger circuit 304-3. The capacitor 302 and the control circuit 304 (e.g., the discharge circuit 304-1, the charge circuit 304-2, and the trigger circuit 304-3) may incorporate functionalities as described with reference to FIG. 2A.

In an embodiment, the capacitor 302 includes a capacitive element 306 with a capacitance of C1, a resistor 308-1 with a resistance of R1, and a ground connection 310-1. As an example, the capacitive element 306 includes conductive layers that are separated by a non-conductive layer. As an example, the capacitor 302 may be included within a PMIC (not shown) or external to a PMIC, e.g., as shown in FIG. 2A and FIG. 2B, respectively. In such an example, if the capacitor 302 is included within the PMIC, then the capacitor 302 may be internally connected to the control circuit 304, and if the capacitor 302 is external to the PMIC, then the capacitor 302 may be externally connected to the control circuit (e.g., via a pin). In an embodiment, the resistor 308-1 may correspond to a parasitic capacitance of the capacitive element 306, and in another embodiment, the resistor 308-1 corresponds to a discrete resistor.

The discharge circuit 304-1 is configured to discharge the capacitor 302. In an embodiment, the discharge circuit 304-1 includes a transistor 312-1 (e.g., a negative-positive-negative (NPN) transistor) with its base connected to a power-down counter (not shown), and a connection to ground 310-2. In some embodiments, if a power-down sequence of a system has not been interrupted, the discharge circuit 304-1 may discharge the capacitor 302 in response to a power-down command. As an example, the discharge circuit 304-1 may be connected to control logic (e.g., control logic 206) within a PMIC (e.g., PMIC 201). In an embodiment, the power-down command may operate according to a power-down counter, which causes the power-down command to discharge and/or remain on for a predetermined amount of time. In such an embodiment, the power-down counter may control the length of time in which the capacitor is discharged.

The charge circuit 304-2 is configured to charge the capacitor 302. In an embodiment, the charge circuit 304-2 includes a transistor 313-1 (e.g., a positive-negative-positive (PNP) transistor) connected to a power supply (e.g., a voltage common collector (VCC)), a resistor 308-2 with a resistance of R2, a transistor 312-2 (e.g., an NPN transistor) with its base connected to a capacitor charge command, and a connection to ground 310-3. A capacitor charge command is used to control charging of the capacitor 302 and may allow the capacitor 302 to avoid discharge if a loss of power supply occurs. As an example, the charge circuit 304-2 may be connected to control logic (e.g., control logic 206) within a PMIC (e.g., PMIC 201) that provides the capacitor charge command.

In an embodiment, the charge circuit 304-2 prevents the capacitor 302 from being charged immediately (e.g., within less than 1 μs) when power returns after a power-down corner case event. In such an embodiment, immediately charging the capacitor 302 may interfere with an indication that voltage rails are discharged. In an embodiment, after the PMIC completes its startup sequence (e.g., power-up sequence), the charge command is given and may be held to prevent discharging over the resistor 308-1. In such an embodiment, the charge command may be coupled to a POR signal (e.g., a reset signal). As an example, a POR circuit (not shown) may assert the reset signal to a system (e.g., Soc) connected to the PMIC for initiation of a startup sequence. In such an example, the POR circuit may be included in a power management system (e.g., a PMIC).

The trigger circuit 304-3 is configured to provide the voltage of the capacitor 302 to control logic. In an embodiment, the trigger circuit 304-3 includes a transistor 313-2 (e.g., a PNP transistor) connected to a startup comparator that is received from the control logic, a resistor 308-3 with a resistance of R3, a transistor 312-3 (e.g., an NPN transistor) connected at its base to a comparator measure command (not shown), and a connection to ground 310-4. As an example, the discharge circuit 304-1 may be connected to a comparator (e.g., comparator 206-1) of control logic (e.g., control logic 206) within a PMIC (e.g., PMIC 201).

The control circuit 304 includes three operations modes, a discharge mode, a charge mode, and a measure mode which are controlled by a power-down command, a capacitor charge command, and a comparator measure command. The three operation modes and corresponding commands are described in further detail with reference to Table 1.

TABLE 1

| Operation of Control Circuit | Power-Down Command | Capacitor Charge Command | Comparator Measure Command |
| --- | --- | --- | --- |
| Discharge Mode | ON | OFF | OFF |
| Charge Mode | OFF | ON | OFF |
| Measure Mode | OFF | OFF | ON |

The discharge mode involves discharging the capacitor 302. In the discharge mode, the power-down command of the discharge circuit 304-1 is in an ON state, the capacitor charge command of the charge circuit 304-2 is in an OFF state, and the comparator measure command of the trigger circuit 304-3 is in an OFF state. When the power-down command of the discharge circuit 304-1 is in an ON state, the transistor 312-1 is on, and the transistors 312-2, 312-3, 313-1, and 313-2 are off. In such an operation, the capacitor 302 is discharged because the capacitive element 306 is connected to ground 310-2 through the transistor 312-1.

The charge mode involves charging the capacitor 302. In the charge mode, the power-down command of the discharge circuit 304-1 is in an OFF state, the capacitor charge command of the charge circuit 304-2 is in an ON state, and the comparator measure command of the trigger circuit 304-3 is in an OFF state. When the capacitor charge command of the charge circuit 304-2 is in an ON state, the transistors 312-2 and 313-1 are on, and the transistors 312-1, 312-3, and 313-2 are off. In such an operation, the capacitor 302 is charged because the capacitive element 306 is connected to the power supply (e.g., VCC) through the transistor 313-1.

The measure mode involves providing the voltage of the capacitor 302 to the startup comparator. In the measure mode, the power-down command of the discharge circuit 304-1 is in an OFF state, the capacitor charge command of the charge circuit 304-2 is in an OFF state, and the comparator measure command of the trigger circuit 304-3 is in an ON state. When the comparator measure command of the trigger circuit 304-3 is in an ON state, the transistors 312-3 and 313-2 are on, and the transistors 312-1, 312-2, and 313-1 are off. In such an operation, the voltage of the capacitor 302 is provided to the startup comparator in the control logic because the capacitive element 306 is connected to the startup comparator through the transistor 313-2.

In an embodiment, the capacitor 302, the discharge circuit 304-1, the charge circuit 304-2, and the trigger circuit 304-3 may each be connected to each other. Although the capacitor 302, the discharge circuit 304-1, the charge circuit 304-2, and the trigger circuit 304-3 are shown as being connected in a certain topology, the capacitor 302, the discharge circuit 304-1, the charge circuit 304-2, and the trigger circuit 304-3 are not limited to the topology shown in FIG. 3. Additionally, although certain transistors are described as providing switching functionality, other switches may be used in place of the transistors to implement elements of the control circuit. Although the transistors are described as being on or off, the transistors may also be described as being open or closed, such that on/open and off/closed may each be used interchangeably.

An example of a power-down corner case event is described in further detail with reference to FIG. 4.

Figure 4:
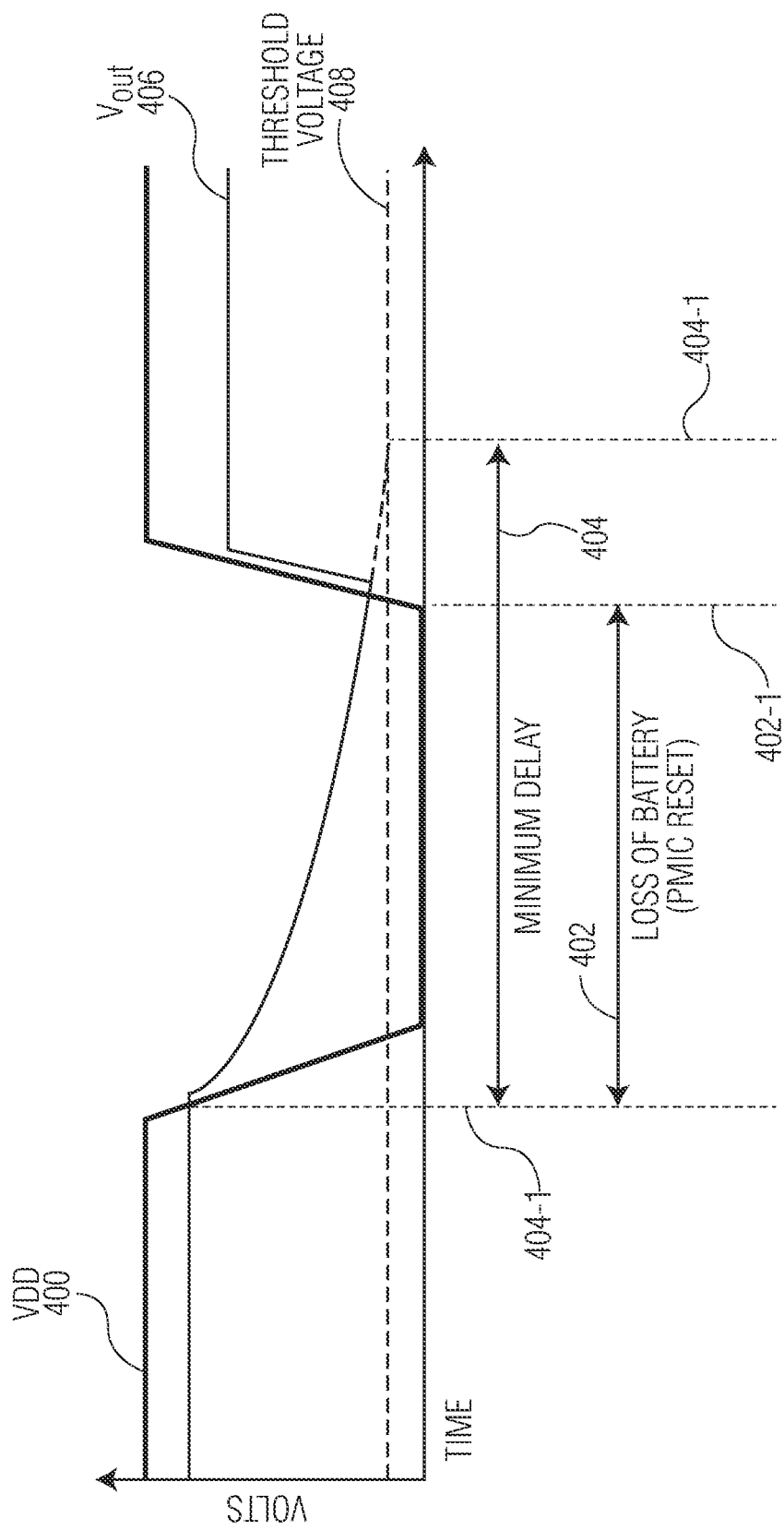
FIG. 4 depicts a graph of voltages that correspond to a power-cycle and a corner case event.

FIG. 4 depicts a graph of voltages that correspond to a power-cycle and a corner case event. As an example, a "power-cycle" may involve a system (e.g., power management system, PMIC, SoC, etc.) powering down (e.g., via a power-down sequence) and subsequently powering on (e.g., via a power-on sequence). In the embodiment of FIG. 4, a PMIC (not shown) powers down and an input voltage of the PMIC (shown by VDD 400) decreases to a predetermined value (e.g., 0V). In an embodiment, at a first time 404-1, an output voltage of the PMIC (shown by $V_{out}$ 406) begins to discharge, but does not fall below a threshold voltage 408 and may be in an unknown state (e.g., unknown state 106), such that a power-down corner case event 402 occurs. As an example, the power-down corner case event 402 may be loss of battery experienced by a system, which causes the PMIC to reset (shown by "loss of battery (PMIC reset)").

In an embodiment, the power-down corner case event 402 is due to voltage rails and/or bulk capacitors of the system not being properly discharged (e.g., the voltage rails and/or the bulk capacitors have not reached 0V). Normally, once the voltage rails and/or the bulk capacitors begin to discharge, e.g., at the first time 404-1, the system may implement a minimum delay 404 to ensure proper discharge of the voltage rails and/or the bulk capacitors, which would have occurred by a second time 404-2 (shown by dashed line extending from $V_{out}$ 406 to the second time 404-2). As an example, no power-up sequence would be possible during the minimum delay 404. However, because the voltage rails and/or the bulk capacitors of the system are in an unknown state (e.g., unknown state 106) during the power-down corner case event 402, the system does not implement the minimum delay 404 and initiates a startup sequence (and a POR) at time 402-1, such that VDD 400 increases. The startup sequence (and the POR) at time 402-1 may cause further issues, e.g., a power-up corner case event, because a startup was initiated when the voltage rails and/or the bulk capacitors were not properly discharged (e.g., bulk capacitors did not reach 0V). Although the PMIC is described as including one output voltage (e.g., $V_{out}$ 406), the PMIC may include more than one output voltage.

By implementing a power management system as described with reference to FIG. 2A, FIG. 2B, and FIG. 3, the system is able to detect that the voltage rails and/or the bulk capacitors have not been properly discharged, e.g., during the power-down corner case event 402. The ability to detect that the voltage rails and/or the bulk capacitors have not been properly discharged allows the system to adaptively implement a wait time before initiation of a startup to ensure that the voltage rails and/or to the bulk capacitors have been properly discharged. When the system implements the wait time before initiation of the startup, the wait time may vary according to a voltage of a capacitor during a power-down event because the voltage of the capacitor corresponds to a voltage of the voltage rails and/or the bulk capacitors, which further indicates the wait time needed for proper discharge of the voltage rails and/or the bulk capacitors. Examples of a graph of voltage that corresponds to a startup performed after different wait times are described in further detail with reference to FIGS. 5A-5C.

FIG. 5A depicts a graph of voltages that correspond to a power-cycle with a startup performed after a wait time in accordance with an embodiment of the invention. In the embodiment of FIG. 5A, the voltage of a system's (e.g., a system connected to a PMIC) voltage rails and/or bulk capacitors changes over time during a power-down corner case event as described with reference to FIG. 4. In an embodiment, the system (not shown) may be connected to a power management system (e.g., a PMIC, power management system 200-1, or power management system 200-2) that detects the power-down corner case event. In such an embodiment, a startup sequence (and a POR) may be initiated after a wait time, $t_{wait}$ 502-1. In an embodiment, the wait time, $t_{wait}$ 502-1, begins once an input voltage, VDD 504, of the power management system gains power (after a power down of the power management system). As an example, the wait time, $t_{wait}$ 502-1, may be determined by the power management system and corresponds to, e.g., a certain amount of time for which it takes an output voltage of the power management system (shown by $V_{out}$ 506) to fall below a threshold voltage 508, such that the certain amount of time allows for proper discharge of the system's voltage rails and/or bulk capacitors. In such an example, the certain amount of time it takes to discharge the system's voltage rails and/or bulk capacitors may depend on specifics of the system design (e.g., size of capacitors, power consumption of SoC, etc.). In some embodiments, a voltage of a capacitor (not shown) may be similar to $V_{out}$ 506. In an embodiment, the wait time, $t_{wait}$ 502-1, may help ensure proper discharge of the system's voltage rails and/or bulk capacitors, such that the power-down corner case event may be avoided. In an embodiment, startup of the system may be initiated after the wait time (e.g., $t_{wait}$ 502-1).

FIG. 5B depicts a graph of voltages that correspond to a power-cycle with a startup performed after another wait time in accordance with an embodiment of the invention. In the embodiment of FIG. 5B, the voltage of a system's (e.g., a system connected to a PMIC) voltage rails and/or bulk capacitors changes over time during a power-down corner case event as described with reference to FIG. 4. In an embodiment, the system (not shown) may be connected to a power management system (e.g., a PMIC, power management system 200-1, or power management system 200-2) that detects the power-down corner case event. In such an embodiment, a startup sequence (and a POR) may be initiated after a wait time, $t_{wait}$ 502-2, once an output voltage of the power management system (shown by $V_{out}$ 506) falls below a threshold voltage 508. In an embodiment, the wait time, $t_{wait}$ 502-2, begins once an input voltage, VDD 504, of the power management system gains power (after a power down of the power management system). As an example, the wait time, $t_{wait}$ 502-2, may be determined by the power management system and is a shorter wait time than $t_{wait}$ 502-1. In such an example, the shorter wait time (e.g., $t_{wait}$ 502-2) may correspond to less of a voltage drop and/or to a longer voltage drop during the power-down corner case event. In an embodiment, the wait time, $t_{wait}$ 502-2, may help ensure proper discharge of the system's voltage rails and/or bulk capacitors, such that the power-down corner case event may be avoided. In an embodiment, startup of the system may be initiated after the wait time (e.g., $t_{wait}$ 502-2). In some embodiments, a voltage of a capacitor (not shown) may be similar to $V_{out}$ 506.

FIG. 5C depicts a graph of voltages that correspond to a power-cycle with a startup performed without a wait time in accordance with an embodiment of the invention. In the embodiment of FIG. 5C, the voltage of a system's (e.g., a system connected to a PMIC) voltage rails and/or bulk capacitors changes over time during a power-down event. In an embodiment, the system (not shown) may be connected to a power management system (e.g., a PMIC, power management system 200-1, or power management system 200-2) that does not detect a power-down corner case event. In such an embodiment, a startup sequence (and a POR) is initiated without delay, such that a wait time, $t_{wait}$ 502-3, is not needed. For example, the wait time, $t_{wait}$ 502-3, is equal to zero and the startup sequence (and the POR) occurs once an input voltage, VDD 504, of the power management system gains power (after a power down of the power management system) and an output voltage of the power management system (shown by $V_{out}$ 506) falls below a threshold voltage 508. In such an example, the wait time, $t_{wait}$ 502-3, is not needed to help ensure proper discharge of the system's voltage rails and/or bulk capacitors during the power-down event because startup of the system can be initiated without the wait time (e.g., $t_{wait}$ 502-3). In some embodiments, a voltage of a capacitor (not shown) may be similar to $V_{out}$ 506.

An example of a function block diagram of a technique for initiating a startup of a system is described in further detail with reference to FIG. 6A.

Figure 6A:
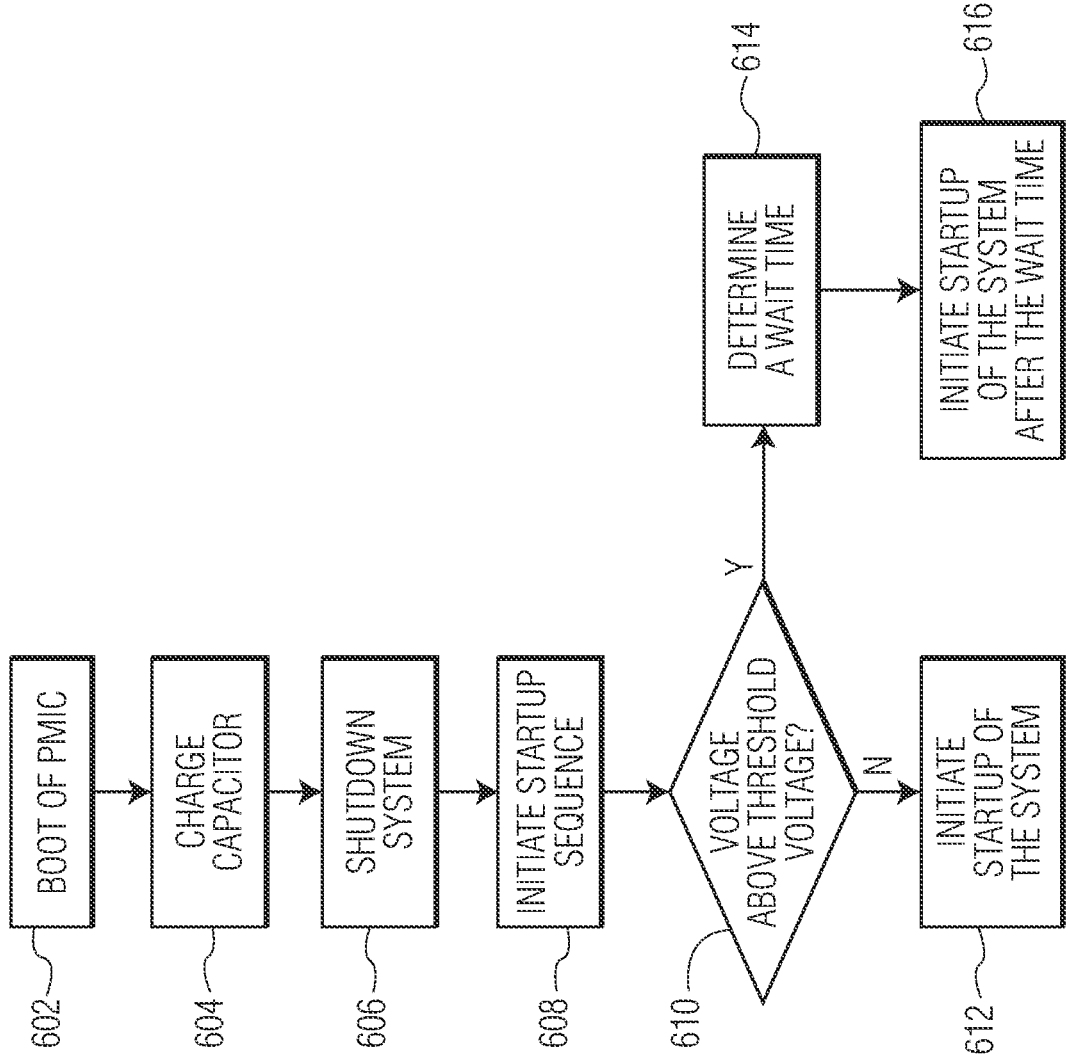
FIG. 6A depicts a process flow diagram of a technique for initiating a startup of a system.

FIG. 6A depicts a process flow diagram of a technique for initiating a startup of a system in accordance with an embodiment of the invention. At block 602, boot of a PMIC (e.g., PMIC 201) occurs, such that boot of the PMIC involves voltage rails of the PMIC being supplied. At block 604, a capacitor (e.g., capacitor 202) may be charged with a voltage. At block 606, a system (e.g., SoC, SoM, MCU, etc.) that may be connected to the PMIC is shutdown. After the system is shutdown, the PMIC may initiate a startup sequence (e.g., a PMIC startup sequence) (and a POR) at block 608. In an embodiment, the startup sequence may involve comparing the voltage of the capacitor to a threshold voltage, such that the startup sequence involves determining if the voltage is above the threshold voltage (shown by block 610). If the voltage is not above the threshold voltage (no shown by "N"), then at block 612, the PMIC may initiate startup of the system. If the voltage is above the threshold voltage (yes shown by "Y"), then at block 614, the PMIC may determine a wait time, and at block 616, initiate startup of the system after the wait time.

In an embodiment, although block 610 involves determining if a voltage is above a threshold voltage, block 610 may involve determining if a voltage is below a threshold voltage or between a plurality of threshold voltages. For example, if block 610 involves determining if a voltage is below a threshold voltage and the voltage is below the threshold voltage (e.g., yes), then a PMIC may initiate startup of the system, and if the voltage is not below the threshold voltage (e.g., no), then the PMIC may determine a wait time and initiate startup of a system after the wait time.

In an embodiment, the process flow diagram of FIG. 6A can be implemented in the power management systems described with reference to FIG. 2A, FIG. 2B, and/or FIG. 3.

Figure 6B:
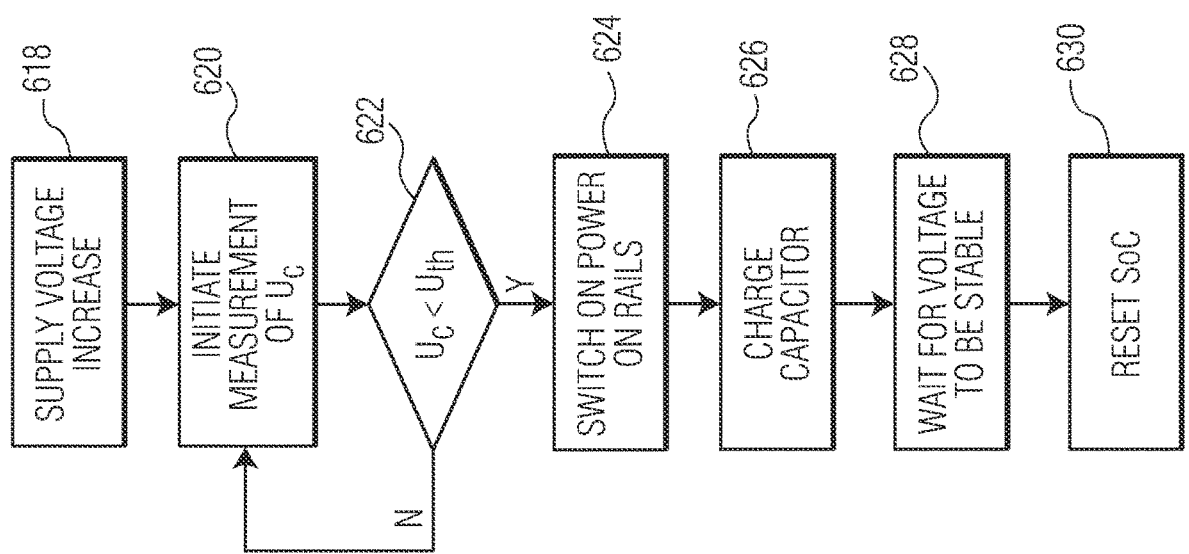
FIG. 6B depicts a process flow diagram of a technique for a Power Management Integrated Circuit (PMIC) startup in accordance with an embodiment of the invention.

Examples of functional block diagrams of techniques for operating a PMIC are provided with reference to FIG. 6B and FIG. 6C.

FIG. 6B depicts a process flow diagram of a technique for a PMIC startup in accordance with an embodiment of the invention. At block 618, a supply voltage (e.g., battery voltage) of the PMIC increases. At block 620, the PMIC initiates measurement of a voltage of a capacitor, $U_C$. As an example, $U_C$ may indicate if voltage rails have been discharged. In an embodiment, measurement of $U_C$ may involve determining if $U_C$ is less than a threshold voltage, $U_{th}$ (shown by block 622). If $U_C$ is not less than $U_{th}$ (shown by "N"), then the PMIC may return to block 620. If $U_C$ is less than $U_{th}$ (shown by "Y"), then at block 624, the PMIC switches on power on rails. After the PMIC switches on power on rails, the PMIC may charge a capacitor at block 626. At block 628, the PMIC may wait for a voltage to be stable, and at block 630, the PMIC may reset a connected system (e.g., SoC).

FIG. 6C depicts a process flow diagram of a technique for a PMIC shutdown in accordance with an embodiment of the invention. At block 632, a shutdown may be triggered from a connected system (e.g., SoC). At block 634, the PMIC may (optionally) assert a reset. As an example, asserting a reset may imply asserting a pin by setting the pin to its active state. At block 636, the PMIC may switch off power rails, and at block 638, the PMIC may wait for rail discharge. After the rail discharge, the PMIC may discharge a capacitor at block 640, and subsequently turn off at block 642.

Figure 7:
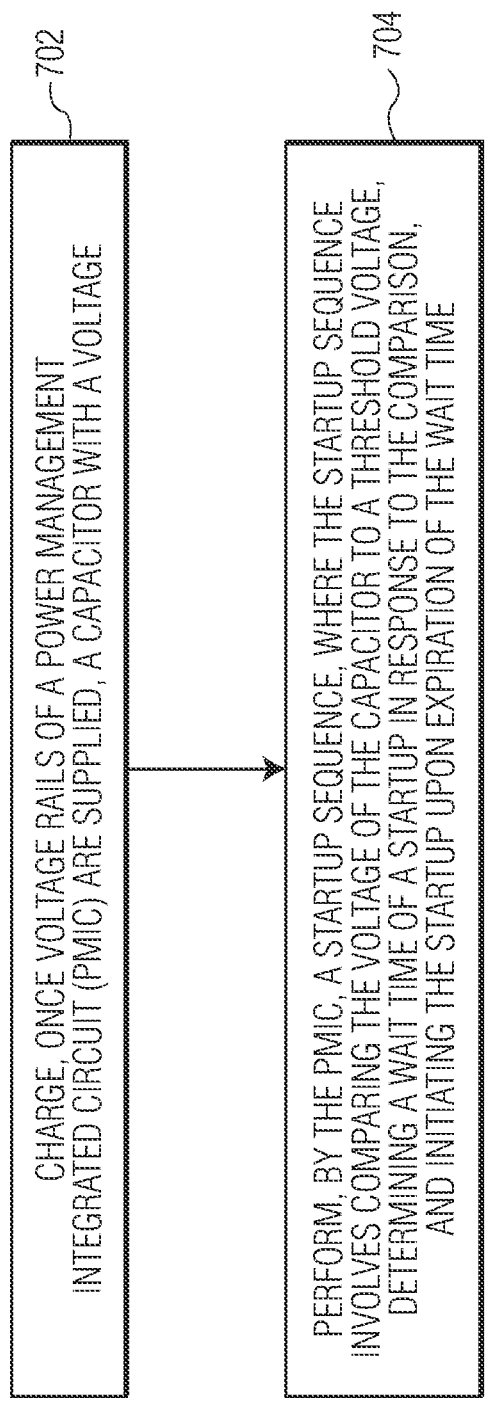
FIG. 7 is a flowchart of a method for operating a power management system.

FIG. 7 is a flowchart of a method for operating a power management system. At block 702, once voltage rails of a PMIC are supplied, a capacitor is charged with a voltage. At block 704, the PMIC performs a startup sequence, where the startup sequence involves comparing the voltage of the capacitor to a threshold voltage, determining a wait time of a startup in response to the comparison, and initiating the startup upon expiration of the wait time.

The preceding detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

The foregoing description refers to elements or features being "connected" or "coupled" together. As used herein, unless expressly stated otherwise, "connected" means that one element is directly joined to (or directly communicates with) another element, and not necessarily mechanically.

Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A power management system comprising:
   a capacitor;
   control logic configured to determine a wait time in response to a comparison of a voltage of the capacitor to a threshold voltage and to initiate a startup upon expiration of the wait time; and
   a control circuit configured to charge the capacitor, discharge the capacitor, and provide the voltage of the capacitor to the control logic, wherein the control circuit includes a discharge circuit, a charge circuit, and a trigger circuit.

2. The power management system of claim 1, wherein the capacitor is charged once voltage rails of a Power Management Integrated Circuit (PMIC) are supplied.

3. The power management system of claim 1, wherein the control logic, the control circuit, and the capacitor are connected within a PMIC.

4. The power management system of claim 1, wherein the control logic and the control circuit are connected within a PMIC, and the capacitor is external to the PMIC.

5. The power management system of claim 4, wherein the PMIC includes a pin for connection to the capacitor.

6. The power management system of claim 1, wherein the discharge circuit includes a switch configured to control discharge of the capacitor.

7. The power management system of claim 6, wherein the charge circuit includes a switch configured to control charging of the capacitor.

8. The power management system of claim 6, wherein the trigger circuit includes a switch configured to provide the voltage of the capacitor to the control logic.

9. The power management system of claim 6, wherein:
   the discharge circuit includes a switch configured to control discharge of the capacitor;
   the charge circuit includes a switch configured to control charging of the capacitor; and
   the trigger circuit includes a switch configured to provide the voltage of the capacitor to the control logic.

10. A method for power management, the method comprising:
    charging, once voltage rails of a Power Management Integrated Circuit (PMIC) are supplied, a capacitor with a voltage;
    performing, by the PMIC, a startup sequence after a power loss, wherein the startup sequence involves:
      comparing the voltage of the capacitor to a threshold voltage;
      determining a wait time of a startup of a system connected to the PMIC in response to the comparison, wherein the startup is a power-on reset of the system; and
      initiating the startup upon expiration of the wait time.

11. The method of claim 10, wherein the PMIC includes control logic and a control circuit connected to the capacitor, and wherein the control circuit includes a discharge circuit, a charge circuit, and a trigger circuit.

12. The method of claim 11, wherein a switch in the discharge circuit is opened to discharge the capacitor.

13. The method of claim 11, wherein a switch in the charge circuit is opened to charge the capacitor.

14. The method of claim 11, wherein a switch in the trigger circuit is opened to provide the voltage of the capacitor to the control logic.

15. The method of claim 11, wherein the control logic, the control circuit, and the capacitor are connected within the PMIC.

16. The method of claim 11, wherein the control logic and the control circuit are connected within the PMIC, and the capacitor is external to the PMIC.

17. The method of claim 10, wherein the wait time is based on the voltage.

18. A Power Management Integrated Circuit (PMIC) comprising:
    control logic configured to determine after a power loss a wait time in response to a comparison of a voltage of a capacitor to a threshold voltage and to initiate a startup of a system connected to the PMIC upon expiration of the wait time, wherein the startup is a power-on reset of the system; and
    a control circuit configured to provide the voltage of the capacitor to the control logic.

19. The PMIC of claim 18, further including the capacitor.

20. The PMIC of claim 18, wherein the PMIC includes a pin for connection to the capacitor.

21. The PMIC of claim 18, wherein the wait time is based on the voltage.

* * * * *